United States Patent
Cha et al.

(10) Patent No.: US 8,675,617 B2
(45) Date of Patent: Mar. 18, 2014

(54) METHODS FOR IMPROVING WIRELESS COMMUNICATIONS WHEN INTERFERENCE OR SIGNAL LOSS IS DIRECTIONAL IN NATURE

(75) Inventors: Inhyok Cha, Yardley, PA (US); Keith Baldwin, Melbourne Beach, FL (US); Yingxue Li, Exton, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 937 days.

(21) Appl. No.: 11/753,115

(22) Filed: May 24, 2007

(65) Prior Publication Data

US 2008/0002627 A1    Jan. 3, 2008

Related U.S. Application Data

(60) Provisional application No. 60/803,803, filed on Jun. 2, 2006.

(51) Int. Cl.
*H04W 4/00*     (2009.01)
(52) U.S. Cl.
USPC ....... 370/338; 370/334; 455/63.4; 455/452.1; 455/423; 343/754; 343/763; 343/777
(58) Field of Classification Search
USPC ........... 370/334, 338, 464; 455/25, 63.4, 455/423–425, 63.1, 452.1; 700/28, 53; 343/742, 751, 754, 763, 776–777
See application file for complete search history.

(56) References Cited

U.S. PATENT DOCUMENTS

| | | | |
|---|---|---|---|
| 6,233,466 B1 * | 5/2001 | Wong et al. | 455/562.1 |
| 6,453,176 B1 * | 9/2002 | Lopes et al. | 455/562.1 |
| 6,600,456 B2 | 7/2003 | Richeson et al. | 343/834 |
| 6,643,526 B1 | 11/2003 | Katz | 455/562 |
| 6,751,206 B1 | 6/2004 | Padovani et al. | 370/335 |
| 6,961,545 B2 | 11/2005 | Tehrani et al. | 455/101 |
| 2002/0094843 A1 * | 7/2002 | Hunzinger | 455/562 |
| 2003/0224828 A1 * | 12/2003 | Ylitalo | 455/562.1 |
| 2004/0114535 A1 * | 6/2004 | Hoffmann et al. | 370/252 |
| 2004/0213187 A1 * | 10/2004 | Fujii | 370/335 |
| 2005/0215262 A1 | 9/2005 | Cha et al. | 455/452.2 |
| 2006/0087423 A1 * | 4/2006 | Coronel et al. | 340/539.1 |
| 2007/0243831 A1 * | 10/2007 | Seki | 455/69 |

FOREIGN PATENT DOCUMENTS

WO    WO 99/55012    10/1999

* cited by examiner

*Primary Examiner* — Marcos Torres
(74) *Attorney, Agent, or Firm* — Allen, Dyer, Doppelt, Milbrath & Gilchrist, P.A (57) ABSTRACT

A client station in a wireless local area network (WLAN) communication system includes a beam commutation algorithm and a smart antenna responsive to the beam commutation algorithm for selecting one of a plurality of directional antenna beams. The smart antenna is configured as a virtual omni-directional antenna by using a commutation of switched directional antenna beams. A switched directional antenna system that performs a commutation sequencing can be blind to environmental conditions and changes.

26 Claims, 9 Drawing Sheets

OPTION 1

FIG. 12

OPTION 2

METHODS FOR IMPROVING WIRELESS COMMUNICATIONS WHEN INTERFERENCE OR SIGNAL LOSS IS DIRECTIONAL IN NATURE

RELATED APPLICATION

This application claims the benefit of U.S. Provisional Application Ser. No. 60/803,803 filed Jun. 2, 2006, the entire contents of which are incorporated herein by reference.

FIELD OF THE INVENTION

The present invention relates to the field of wireless local area networks (WLANs), and more particularly, to a client station operating with a smart antenna in a WLAN.

BACKGROUND OF THE INVENTION

Smart antenna technology is directed to antennas having the ability to change radio beam transmission and reception patterns to suit the environment within which radio communication systems operate. Smart antennas have the advantage of providing relatively high radio link gain without adding excessive cost or system complexity.

Smart antenna technology has been used in wireless communication systems for decades, and has recently been investigated for use in wireless local area networks (WLANs). In a WLAN, a client station (CS) is a device used by a mobile end user for communication with other stations within the same WLAN or with other entities outside of the WLAN. Central hubs that provide distribution services in WLANs are referred to as access points (APs). Access points are similar to base stations in wireless telecommunication systems.

A client station can be equipped with a smart antenna as well as an antenna steering algorithm that enables the antenna to switch electronically to a particular directional antenna beam. This enables the client station to communicate with its access point while achieving high performance.

For a client station operating in a WLAN, available signal conditions may often be sufficiently degraded when viewed in all directions using an omni-directional antenna. However, the signal may be received when directional selectivity is used. Fine-combed scanning of every direction, using steerable or beam formed smart antennas, is possible but can be very costly in terms of both hardware/software implementation and beam searching or beam forming processing time.

A need exists to enable client stations to perform in these conditions without having to finely scan the environment. Example scenarios where this condition may exist include interference that is dominant in one direction and the desired signal source is present in another direction, at the edge of a coverage area (or in a hidden node) where the signal may be very weak and present only in a very limited direction, and zones of destructive multipath combination when all angles are observed and where the paths are widespread in angle.

SUMMARY OF THE INVENTION

In view of the foregoing background, it is therefore an object of the present invention to enable a client station with a smart antenna to operate in a WLAN without having to finely scan the environment when interference signals are dominant in one or more directions.

This and other objects, features, and advantages in accordance with the present invention are provided by a client station for operating in a wireless local area network (WLAN) communication system, wherein the client station comprises a switched beam antenna for generating a plurality of directional antenna beams for receiving desired signals along with interference signals, a beam switching unit coupled to the switched beam antenna for selecting the plurality of directional antenna beams, and a transceiver coupled to the beam switching unit.

A beam commutation module runs a beam commutation algorithm for performing a commutation sequencing of the plurality of directional antenna elements so that a virtual omni-directional antenna beam is formed for receiving the desired signals and the interference signals.

A switched directional antenna system that performs a commutation sequencing can be blind to environmental conditions and changes. Such a system avoids time consuming environmental scans, and avoids rapid tracking of environmental changes, such as mobility. Also, a costly fine-combed beam selector or beam former is avoided.

Moreover, at least part of the time a useable signal is observed when the antenna beam is steered away from the interference signals. Directional antenna elements can provide greater gain than an omni-directional antenna, thus enabling signal reception of weak signals.

The commutation sequencing may sequence through opposing directional antenna beams consecutively. Alternatively, the commutation sequencing may sequence through the directional antenna beams from a wide set of directional antenna beams to a narrower set of directional antenna beams. In another approach, the commutation sequencing may sequence through all possible sequence combinations of the directional antenna beams. The commutation sequencing may even be non-periodic.

The plurality of directional antenna beams may be grouped into pairs, with the directional antenna beams in each pair being directly adjacent one another. Yet another approach is that the commutation sequencing may sequence through opposing pairs with a directional antenna beam being alternately selected in each opposing pair.

The client station may further comprise at least one additional switched beam antenna, at least one additional beam switching unit and at least one additional transceiver so that it is configured as a multiple input multiple output (MIMO) system. In this configuration, the beam commutation module may run the beam commutation algorithm so that a respective commutation sequencing is performed for each switched beam antenna for forming a virtual omni-directional antenna beam associated therewith. In one approach, the commutation sequencing may be different for each switched beam antenna for increasing spatial separation for each receive direction. In another approach, the commutation sequencing may be the same for each switched beam antenna for increasing energy collection for maximal ratio combining (MRC).

The switched beam antenna may comprise N antenna elements comprising at least one active antenna element and up to N−1 passive antenna elements.

Another aspect of the invention is directed to a method for operating a client station in a wireless local area network (WLAN) communication system comprising a switched beam antenna, a beam switching unit coupled to the switched beam antenna, and a transceiver coupled to the beam switching unit. The method comprises operating the beam switching unit for selecting the plurality of directional antenna beams for receiving desired signals along with interference signals, and running a beam commutation algorithm for performing a commutation sequencing of the plurality of directional antenna elements so that a virtual omni-directional antenna beam is formed for receiving the desired signals and the interference signals.

Another aspect of the invention is directed to a client station for operating in a wireless local area network (WLAN) communication system, wherein the client station comprises a switched beam antenna for generating a plurality of directional antenna beams for exchanging signals, a beam switching unit coupled to the switched beam antenna for selecting the plurality of directional antenna beams, and a transceiver coupled to the beam switching unit.

A beam commutation module runs a beam commutation algorithm, and when the beam commutation algorithm determines that an optimum direction for exchanging the signals is between two adjacent directional antenna beams, then the beam commutation algorithm operates with a subset of the directional antenna beams so that the switched beam antenna operates as a virtual beam former.

This is accomplished by selecting one of the directional antenna beams from the subset of directional antenna beams that is adjacent one side of the optimum direction for exchanging the signals, and selecting another one of the directional antenna beams from the subset of directional antenna beams that is adjacent the other side of the optimum direction for exchanging the signals. The beam commutation algorithm alternates selection of the directional antenna beams on each side of the optimum direction for exchanging subsequent signals.

When the exchanged signals are transmitted by the client station, and when soft packet combining is performed at an intended receiver, the virtual beam former advantageously allows a switched beam smart antennas to approximate a true beam forming device. As a result, increased link gains may be obtained. In a situation where the client station and the intended receiver are in a relative movement which the beam former or a single beam selector cannot track well in time, the virtual beam former advantageously enables an alternative to true beam tracking while providing link gains.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
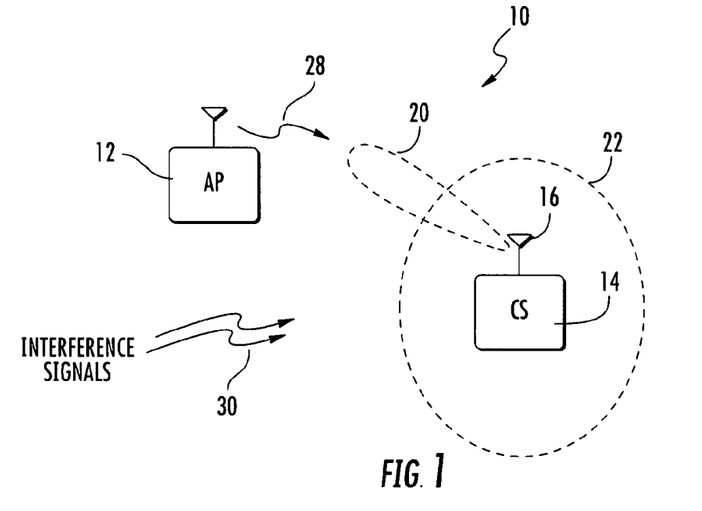
FIG. 1 is a schematic diagram of an 802.11 wireless local area network (WLAN) including an access point providing a desired signal, a client station operating with a smart antenna, and interference signals in accordance with the present invention.
Figure 2:
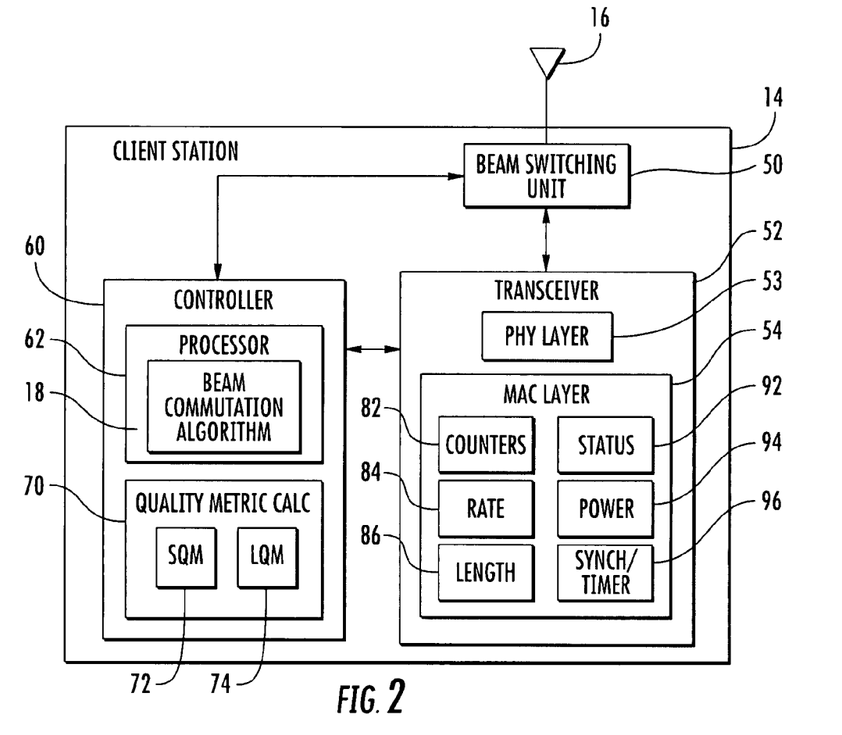
FIG. 2 is a block diagram of the client station shown in FIG. 1.

Referring initially to FIGS. 1 and 2, an 802.11 wireless local area network (WLAN) 10 includes an access point 12, and a client station 14 operating with a subscriber based smart antenna 16 in accordance with the present invention. The smart antenna 16, which will also be referred to as a switched beam antenna, generates a plurality of antenna beams in response to a beam commutation algorithm 18. The antenna beams generated by the smart antenna 16 include directional beams 20 and an omni-directional beam 22. Alternatively, the smart antenna 16 may only form directional beams 20. The illustrated directional beam 20 is one of a plurality of switched directional antenna beams for exchanging desired signals 28 with the access point 12. Interference signals 30 may also be present in one or more directions with respect to the client station 14, as shown in FIG. 1.

The client station 14 includes a beam switching unit 50 connected to the smart antenna 16, and a transceiver 52 connected to the beam switching unit. A controller 60 is connected to the transceiver 52 and to the beam switching unit 50. The controller 60 includes a processor 62 for executing the beam commutation algorithm 18. Alternatively, the beam commutation algorithm 18 may operate on an 802.11 PHY/MAC chipset instead of the illustrated processor 62. The PHY/MAC chipset includes the illustrated PHY layer 53 and the MAC layer 54. Regardless of the processor executing the beam commutation algorithm 18, the algorithm utilizes information provided by what is typically called the upper MAC or MAC management portion of the MAC software, either via MAC abstraction available for access by the external host processor 62 or on the PHY/MAC chipset.

The controller 60 includes a quality metric calculator 70 for determining quality metrics (QM) of the received signals. The quality metric calculator 70 includes a signal quality (SQ) module 72 for determining the signal quality metrics, and a link quality (LQ) module 74 for determining the link quality metrics.

The MAC layer 54 includes counters 82 for providing a MAC Frame Detection Ratio (MFDR), defined as (1-MFER), where MFER is the MAC frame error ratio. The LENGTH and RATE information can be obtained from the 802.11 MAC layer 54 for each of the transmitted or received MAC frames.

A RATE module 84 and a LENGTH module 84 are used to provide estimates of the MAC-layer transfer rates in both downlink (receive side) and uplink (transmit side). Such estimated transfer rates are computed from the LENGTH and RATE information per transmitted or received MAC frames over a period of time.

The beam commutation algorithm 18 may be operated in response to three functions the MAC layer performs. The functions are notification of a change in the MAC_STATUS, MAC_PowerMode and Beacon Period Synchronization Information. The following modules within the MAC layer 54 are associated with these functions: Status 92, Power 94 and Synchronization 96. The MAC_STATUS function 92 and the MAC_PowerMode 94 function notify the beam commutation algorithm 18 of changes in the MAC states within the MAC layer 54. The notification ensures that the MAC states are appropriate so that the beam commutation algorithm 18 will operate accordingly. The Beacon Period Synchronization Information 96 used by the MAC layer 54 allows the beam commutation algorithm 18 to maintain tight synchronization with the actual beacon periods.

The use of directional antenna beams 20 improves the throughput of the WLAN 10 and increases the communication range between the access point 12 and the client station 14. A directional antenna beam 20 provides a high signal-to-noise ratio in most cases, thus allowing the link to operate at higher data rates. The PHY data rates for 802.11b links are 1, 2, 5.5, and 11 Mbps, and the rates for 802.11a are 6, 9, 12, 18, 24, 36, 48 and 54 Mbps. The 802.11g devices support the same data rates as 802.11a devices as well as the rates supported by 802.11b rates. Even though an 802.11 WLAN is discussed with respect to the beam commutation algorithm 18, the algorithm may be adapted to other types of local area networks, as readily appreciated by those skilled in the art.

The subscriber based smart antenna 16 comprises N antenna elements. When the N antenna elements include at least one active element and up to N−1 passive antenna elements, a switched beam antenna is formed. Alternatively, when the N antenna elements are all active, then a phased array antenna is formed.

The present invention is directed to the smart antenna 16 being configured as a virtual omni-directional antenna. A virtual omni-directional antenna is implemented using commutation of switched directional beams 20.

Figure 3:
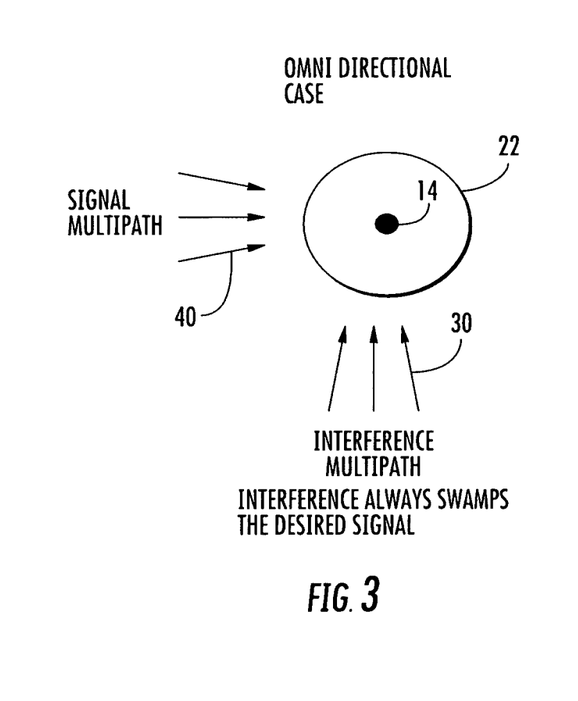
FIGS. 3 and 4 illustrate omni and directional antenna beams subjected to signal multipath and interference multipath in accordance with the present invention.
Figure 4:
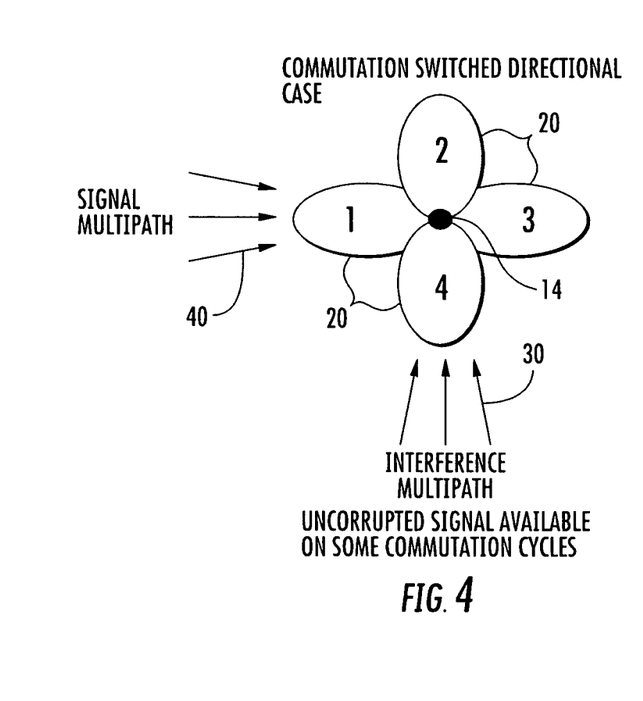

Interference examples will be discussed in reference to FIGS. 3 and 4. In FIG. 3, an omni-directional antenna beam 22 receives signal multipath 40 and interference multipath 30 that effect the desired signal. For switched directional antenna beams 20, uncorrupted signal multipath 40 is received on antenna beam 1, whereas antenna beam 4 received the interference multipath 30.

Figure 5:
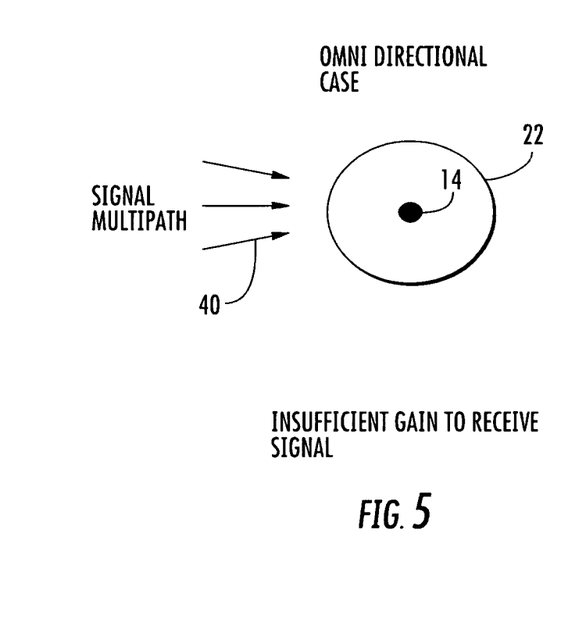
FIGS. 5 and 6 illustrate omni and directional antenna beams subjected to a weak signal in accordance with the present invention.
Figure 6:
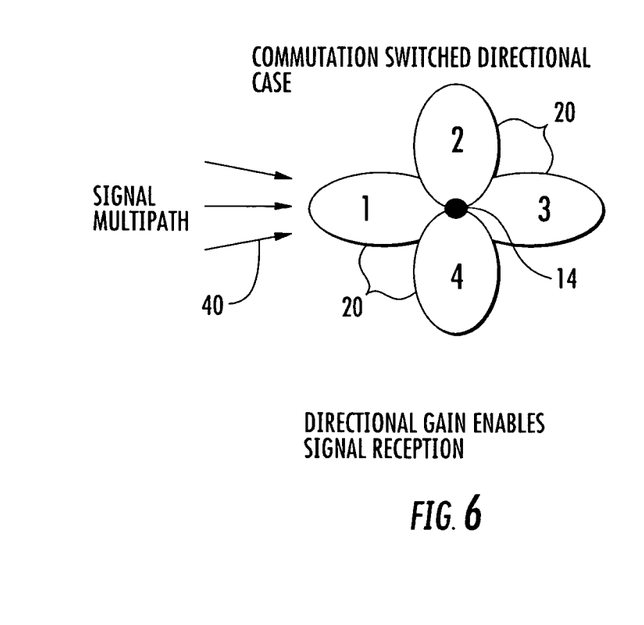

When the received signal is weak, there is insufficient antenna gain to receive the signal using an omni-directional antenna beam 22, as shown in FIG. 5. However, switched directional antenna beams 20 enable signal reception on antenna beam 1, for example, as shown in FIG. 6.

Figure 7:
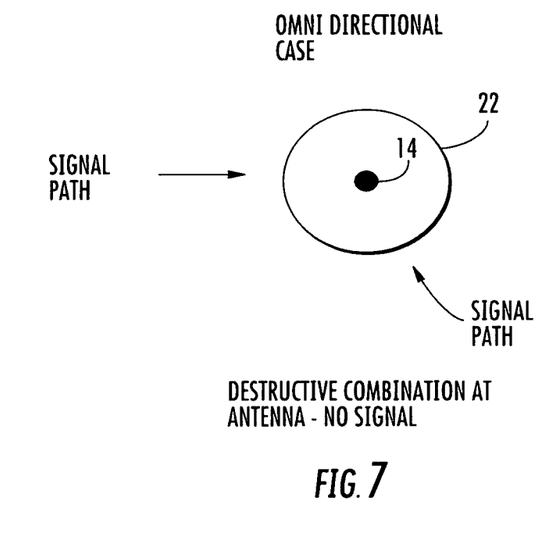
FIGS. 7 and 8 illustrate omni and directional antenna beams subjected to a multipath hole scenario in accordance with the present invention.
Figure 8:
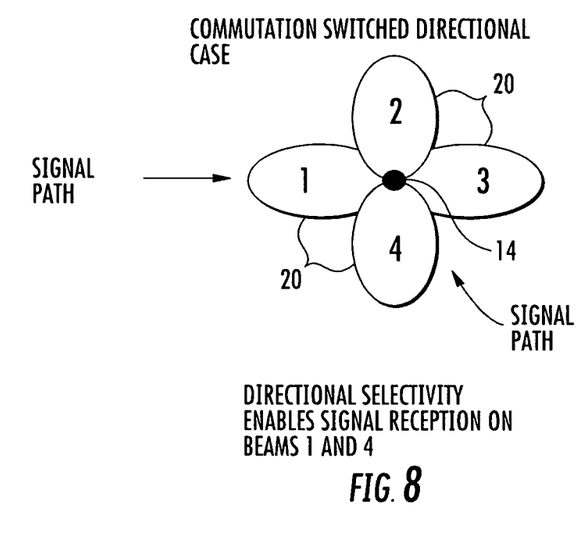

In a multipath hole example, there is a destructive RF signal combination at the omni-directional antenna 22 so that the result is no signal, as shown in FIG. 7. In FIG. 8, directional selectivity of the switched directional antenna beams 20 enables reception on antenna beams 1 and 4.

In terms of advantages, at least part of the time a useable signal is observed when the antenna beam is steered away from the interference. Directional antenna elements 20 can provide greater gain than an omni-directional antenna 22, thus enabling signal reception of weak signals.

A switched directional antenna system that performs a commutation sequencing can be blind to environmental conditions and changes. Such a system avoids time consuming environmental scans, and avoids rapid tracking of environmental changes (mobility). Also, a costly fine-combed beam selector or beam former is avoided. However, a disadvantage is that one or several commutation cycles may not be useable. Compared to a non-functional omni-directional antenna this may be moot.

A WLAN re-association scenario will now be discussed. There is an initial connection from a client station 14 to an access point 12. When the client station 14 uses an antenna beam fixed to one particular direction, the connection may fail due to a recently degraded environment. The nature of the environmental degradations is unknown.

Systematic scan of the environment using multiple directional antenna beams takes several access point beacon cycles to confidently determine direction selection. (e.g., three beams, left-right-omni, 500 ms each on average, then association protocol).

The client station 14 implements a virtual omni-directional commutation with direction selections, one of which favors the signal enough to establish communications with the access point 12, i.e., association. (e.g., left and right commutation, 50% duty cycle, concurrent association protocol) Association is completed in less time while final selection decision metrics are collected.

Figure 9:
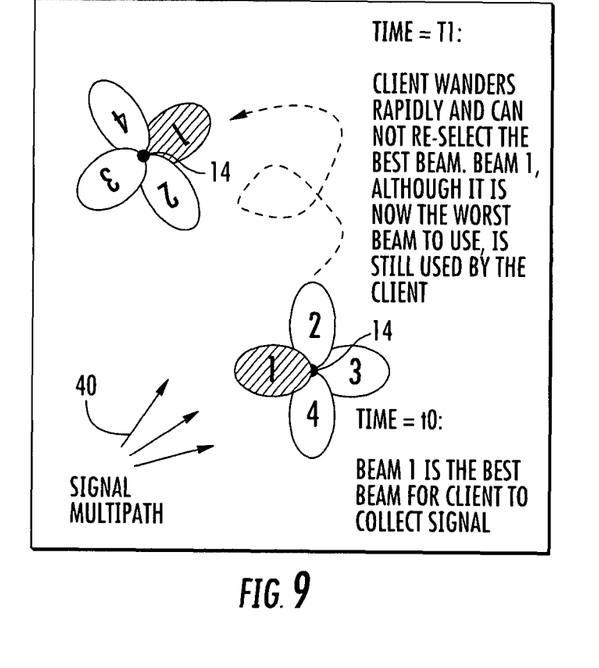
FIG. 9 illustrates directional antenna beams subjected to high mobility in accordance with the present invention.
Figure 10:
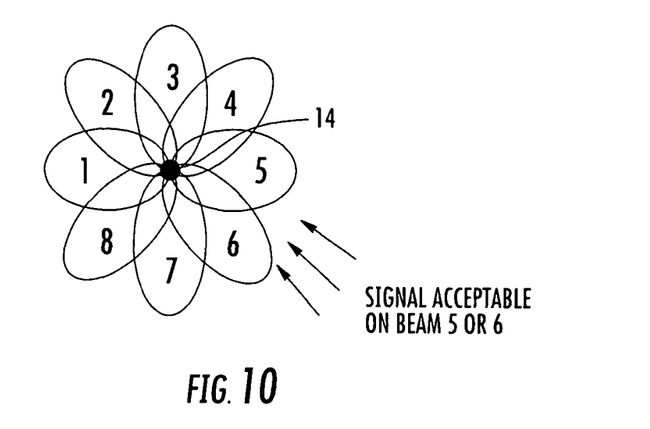
FIG. 10 illustrates directional antenna beams supporting a full commutation sequence in accordance with the present invention.

A high mobility scenario will now be discussed in reference to FIG. 9. The signal environment is narrowly oriented and the client station 14 moves too rapidly in orientation to track relative directional changes. Without commutation, the client station 14 dwells on antenna 1 and loses signals for extended periods causing loss of association. With commutation, the client station 14 suffers short outages, but maintains enough traffic to stay associated.

A full commutation sequence design will now be discussed in reference to FIG. 9. When larger numbers of direction options exist, reduced dead periods can result from a good design of the commutation sequence. Selection options are grouped in sets of "like" directions. Commutation proceeds to sequentially draw from alternate sets.

For example, N=8.

A poor sequence is 1, 2, 3, 4, 5, 6, 7, 8.

A good sequence is 1, 5, 3, 7, 2, 6, 4, 8.

Maximum separation sets include 1&2, 3&4, 5&6, 7&8. In the illustrated figure, the signal is acceptable on antenna beams 5 and 6.

Another full commutation sequence will now be discussed. Other design criteria and examples will be discussed with N=4 in reference to FIG. 9.

a. Sequences where opposing antenna beams are looked at consecutively with maximum frequency. A not so good design is 1, 2, 3, 4, 1, 2, 3, 4. However, a good design is 1, 3, 4, 2, 1, 3, 4, 2.

b. Sequences with progressive narrowing of the coverage angles, from wider sets to narrower set. An example is 1&2, 3&4, 1&3, 2&4, 1, 3, 4, 2, . . . .

c. Sequences that provide all transitions between adjacent antenna beams. A not so good design is 1, 2, 3, 4, 1, 2, 3, 4, 1, 2, 3, 4, 1, . . . . This sequence contains only 4 transitions 1 2, 2 3, 3 4, 4 1. A good design is 1, 2, 4, 3, 1, 4, 2, 3, 4, 1, 3, 2, 1, . . . . The sequence contains all 12 possible transitions, i.e., 1 2, 2 1, 1 3, 3 1, 1 4, 4 1, 2 3, 3 2, 2 4, 4 2, 3 4, 4 3.

A reduction in commutation sequence length is possible if a limited number of particularly advantageous selection sets are used. With this technique, it is possible to miss some useful combinations. However, average performance can be better due to less frequently advantageous selections. Advantageous sets can be determined a priori through computer analysis or formed adaptively over time.

When environmental degradation characteristics are highly periodic in nature, non-periodic commutation sequences are advantageous. Random commutation could, for example, maximize chances that two or more commutating devices reach good communication links when the devices are not aware of, or not capable of estimating sequences of commutation.

As an example, a microwave oven is on ½ second and off ½ second. A periodic commutation sequence with 10 cycles (selection directions) dwelling for 100 ms per direction will see interference in 5 out of 10 dwells. If the best pointing direction occurs when interference is present, performance may be less than if it were to occur when interference is not present. Periodic sequences avoid synchronization with periodic degradation events.

If client stations can either know a priori or estimate the commutation, then using carefully chosen, deterministically sequential commutations at all stations may help multiple devices to maximize chances of attaining good communication links.

The commutation sequence may also be applied to multiple input multiple output (MIMO) systems. A block diagram of a MIMO system is provided in FIG. 11. The illustrated client station 114 is configured as a MIMO system by including more than one smart antenna 116, more than one beam switching unit 150 and more than one transceiver 152. The controller 160 is connected to the transceivers 152 and to the beam switching units 150.

Figure 11:
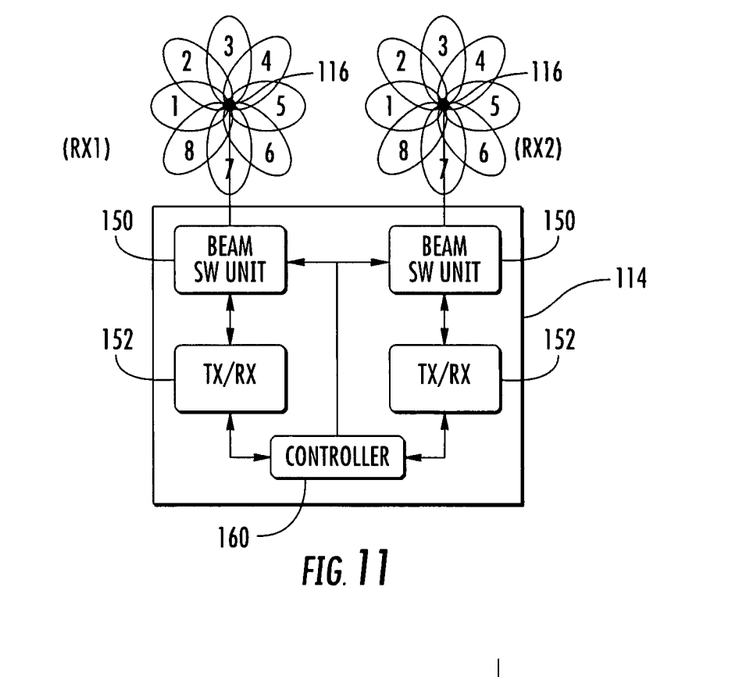
FIG. 11 illustrates a MIMO system operating with a commutation sequence in accordance with the present invention.

The MIMO system 114 can have several selection options per receive chain. Several commutation set criteria can be advantageous. A maximal spatial separation for each receive chain direction is possible. This results in a maximum de-correlation of signals for spatially multiplexed signals.

A maximum spatial coherence is also possible. This results in maximum energy collection for maximal ratio combining (MRC). Combination sets are also possible (favor SM, favor MRC, repeat, . . . ). An example sequence for spatial multiplexing includes the following for RX1/RX2: 1/5, 3/7, 2/6, 4/8, 5/1, 7/3, 6/2, 8/4. Another example sequence based on MRC includes the following for RX1/RX2: 1/1, 2/2, 3/3, 4/4, 5/5, 6/6, 7/7, 8/8.

Figures 12, 13:
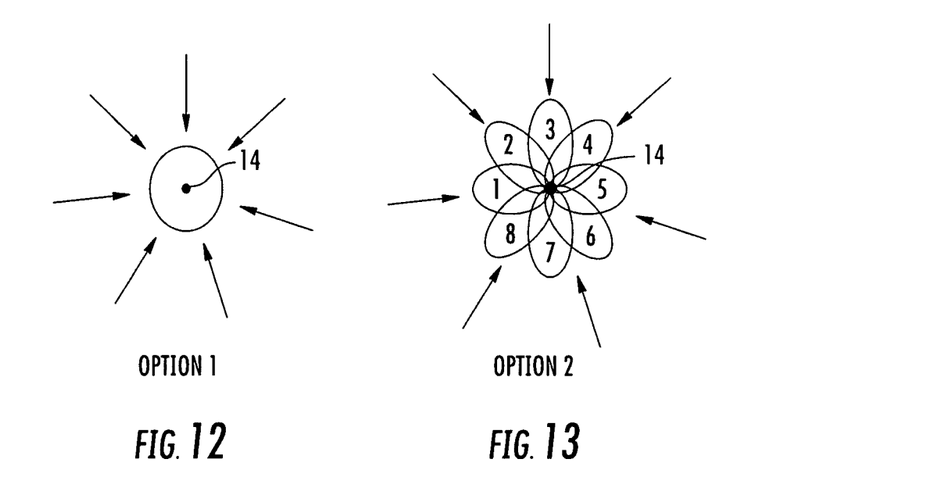
FIGS. 12 and 13 illustrate omni and directional antenna beams subjected to a mitigating hidden node scenario in accordance with the present invention.

The commutation sequence design may also be applied to hidden node problems. WLAN networks employ CSMA mechanisms to share the wireless medium. Successful detection of an in-band RF signal is key to avoiding data packet collision. Considering the total energy collected by a client station 14 within a certain time interval is possible. Option 1: use the omni-directional antenna all the time as shown in FIG. 12. Option 2: cycles through the directional antenna beams (1→2→3→4→5→6→7→8) as shown in FIG. 13.

Still referring to the hidden node problem, for an RF signal with any waveform, energies collected within certain time intervals are random variables due to the random nature of RF propagation. The average collected energy is equal for option 1 and 2. However, the variance can be much smaller with option 2 than option 1. There is an implication to the hidden node problem. Using a virtual omni-directional antenna concept increases probability of detecting RF signals before a data packet is transmitted, therefore reducing the chance of a hidden node happening.

Another aspect of the invention will now be discussed in which the smart antenna 16 is configured as a virtual beam former. A virtual beam former is implemented using a subset of the available directional antenna beams 20.

A first problem scenario will now be discussed. In a wireless system, such as 3G and WLAN systems, optimum communications can require approaches where packets are transmitted via finely-tuned optimum beam formers that direct signal energy to optimal directions for the receiver. Such optimum, packet-level beam forming solutions are often too expensive to implement, especially for consumer devices such as mobile phones or WLAN station cards.

A sub-optimum approach is to use a switched-beam directional smart antenna 16, where, for a given link between the transmitter 52 and the receiver 100, an optimum beam, out of N possible available fixed directional beams, is searched and selected during a beam-searching phase. This antenna beam is then the selected antenna beam and is used in subsequent transmission of packets for a given duration.

However, switched-beam smart antennas 16 have conflicting constraints on its usage, such as, with a larger N, better pointing selections can be obtained but only at the cost of an increased time for searching. This often can take more time than can be allowed under time-varying fading conditions. With a small N, the beam pointing direction may not have enough accuracy to reasonably approximate the true optimum direction.

The first problem, then, is to approximate the performance of a true beam former with a switched-beam smart antenna 16 with more limited patterns available. As an example, reference is directed to FIGS. 14 and 15. Due to a small N (N=4 in this example), which results in wide beam widths of individual antenna beams of the switched beam antenna 16, the pointing direction of the best searched antenna beam, i.e., beam 1, is not accurate enough to enable communication between the transmitter 52 and the receiver 100.

Figures 14, 15:
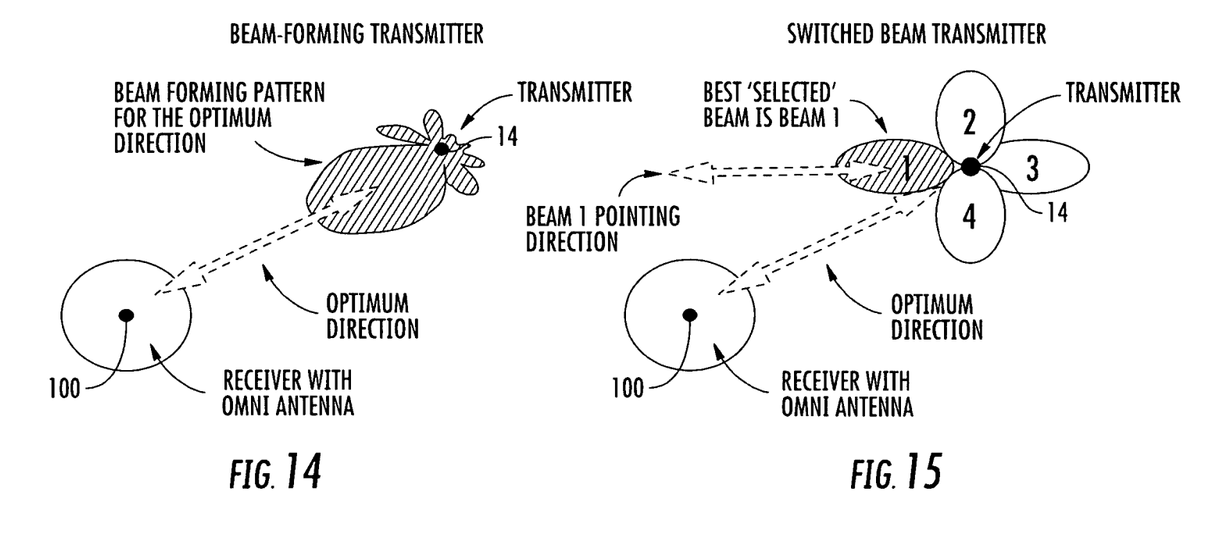
FIGS. 14 and 15 illustrate the accuracy of operating with a beam former transmitter and a switched beam transmitter in accordance with the present invention.

The beam former as shown in FIG. 14 allows enough pointing accuracy for optimum direction but is very expensive. The switched beam transmitter in FIG. 15 does not have enough accuracy to realize an acceptable communication link.

Figure 16:
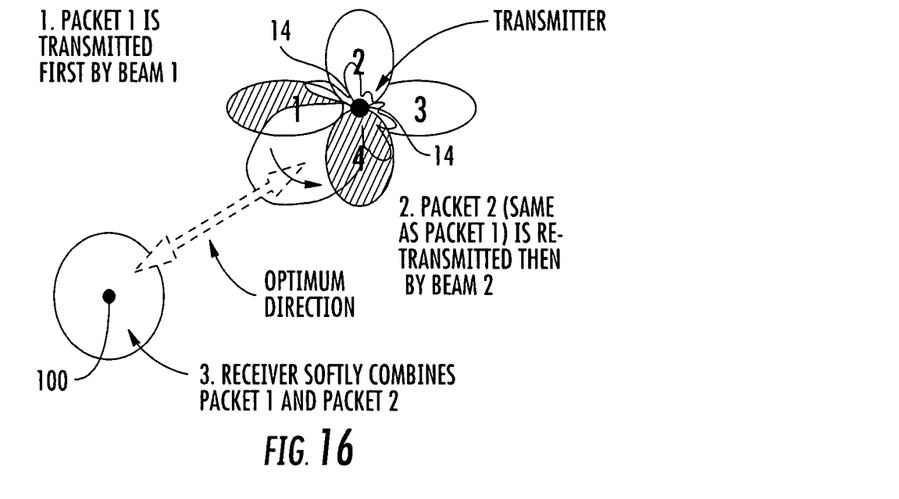
FIG. 16 illustrates a switched beam transmitter operating as a virtual beam former in accordance with the present invention.

One approach to address this problem is to use a sequential-beam (re)transmission, or virtual beam forming. Since the optimum direction is somewhere between the pointing direction of beam 1 and beam 4, as shown in FIG. 16, both beam 1 and beam 4 are used in a sequence for transmission and re-transmission of packets.

The transmitter, during a beam-searching phase, identifies that beam 1 and beam 4 are the best and the second best beams, respectively. Packet 1 is sent first by beam 1. The retransmission packet 2 is then sent by beam 4. At the receiver, packet 1 and packet 2 are combined in a soft packet combiner. Such a scheme may approximate the optimum beam forming approach in a virtual way, i.e., to provide a virtual (optimum) beam former.

A second scenario will now be discussed. In this problem, either beam forming or a switched beam smart antenna is being used to find the 'best' beam, at any given time, to use for communication from its transceiver to a destination transceiver.

Suppose, however, that the transceiver 52 and the destination receiver 100 are in a relative motion constantly, where the motion creates a dynamic fading channel. Suppose also that the magnitude of the displacement from the movement is bounded. The movement may even be circular or periodic.

The position is taken that the smart antenna 16 is not capable of tracking the dynamic changes in the channel, such that, when you select the 'best beam' it is not really the best beam the next time when you use the beam.

However, even if the current 'selected beam' is not the optimal beam it is possible that, first, the selected beam is still a good beam to use, and secondly, that the truly optimal beam at the current time may be a beam that is similar (in angular terms or in other senses) to the beam that you have selected in the past as your 'best beam'

To address this problem, a determination is made on how to choose the antenna beams to ensure that the client station 14 will get good performance in some dynamic channel environment. To illustrate the problem, reference is directed to FIGS. 17 and 18. Due to relative motion between the transmitter and the receiver, and the inability of the smart antenna to track the best beam in time, the selected beam, may not be optimal.

Figure 17:
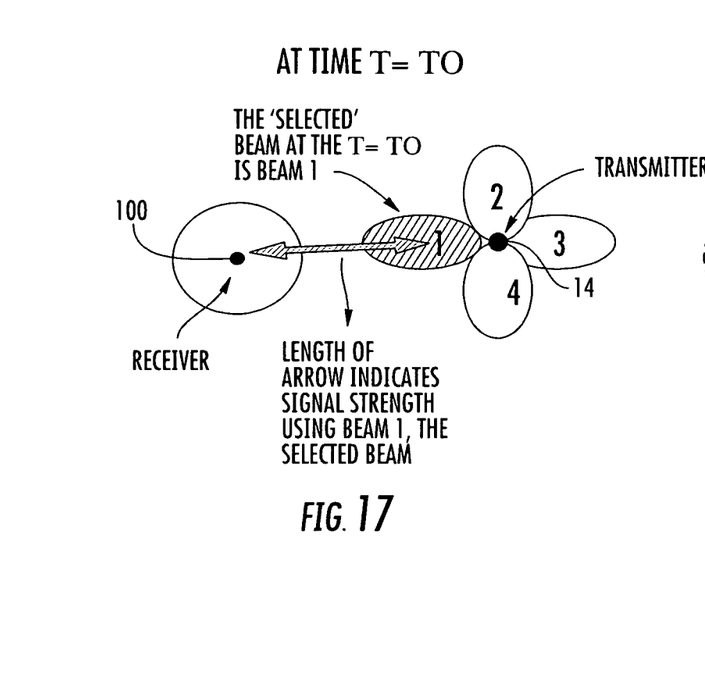
FIGS. 17 and 18 both illustrate the effect of relative motion on a switched beam transmitter in accordance with the present invention.
Figure 18:
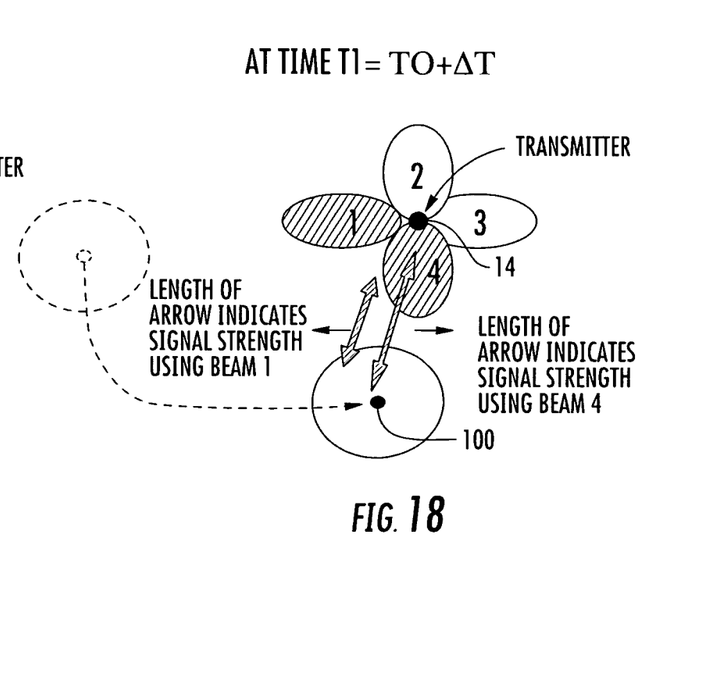

As shown in FIG. 17, at time T=T0, the switched beam smart antenna 16 selects beam 1 as the selected beam. However, while the selection is made or right after that, the receiver 100 starts to move. In FIG. 18, due to the fact that the smart antenna 16 could not track the movement fast enough, the transmitter still uses beam 1, which is still a good beam but not the optimum beam, which is beam 4.

Virtual beam forming is performed to address this problem. During the time that beam 1 was initially selected as the 'selected beam', the beam commutation algorithm 18 measures the signal strengths of 'adjacent' or 'candidate' beams, such as beam 4 and beam 2.

When, due to the movement of the receiver 100, for example, the link quality change is suspected at the transmitter 52, the transmitter starts the 'virtual beam forming' by sequencing beams 1, 2, and 4 in its transmission of subsequent packets.

Figure 19:
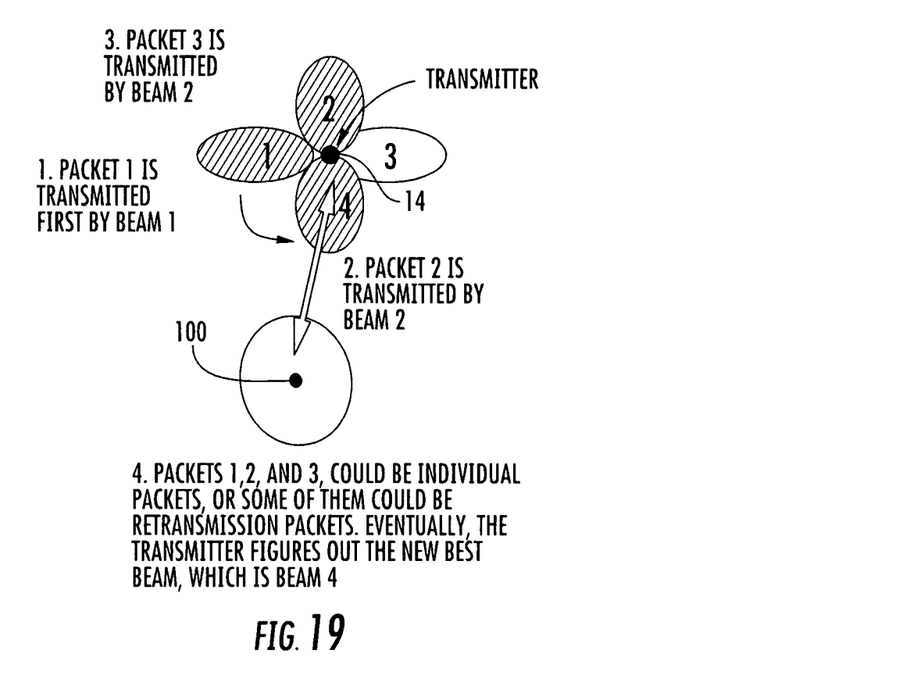
FIG. 19 illustrates a switched beam transmitter operating as a virtual beam former to address relative motion as shown in FIGS. 17 and 18.

After the signal strengths or link quality measurements from the transmissions from the different sequences are fed back to the smart antenna, in the form of either reciprocal reception, or from ACK-type of measurements, the smart antenna 18 eventually decides that beam 4 is the firm, best new beam, and sticks to that beam, as best shown in FIG. 19.

After a while, the beam commutation algorithm 18 scans all beams, to generate again the list of 'candidate' beams to be used next time when the 'virtual beam forming' takes place.

Advantages and possible issues of virtual beam forming will now be discussed. In terms of advantages, there is an approximation of a true beam forming approach. Combined with soft packet combining at the receiver, the virtual beam former may allow switched-beam smart antennas to approximate the true beam forming transmitter and provide link gains. Handling bounded relative motion and resultant dynamic channel fading is possible. In a situation where the transmitter 52 and the receiver 100 are in a relative movement which the beam former or a single beam selector cannot track well in time, the virtual beam former may enable an alternative to true beam tracking and provide link gains.

Possible issues include wasted bandwidth. Used in a protocol where no ACK is sent back to the transmit side, and if most beams in the 'beam sequence' are not good, then the retransmissions can be wasteful. Possible solutions to this issue include the use of a 'beam sequence' and retransmission, which can be enabled if the transmitter senses that even the best beams are not good enough when taken alone. In a no ACK case, the transmitter 52 can estimate the link quality when in the receive mode.

Some communication protocols may not allow packet soft combining at the receiver 100. Even if a protocol allows packet soft combining, the feature may not be implemented at the receiver due to cost. A non-combining receiver can still benefit by the following. Instead of soft combining, the receiver could simply do 'selection' combining, i.e., the receiver 100 will simply see if either of the packets are received with no packet error and process either or both of the error-free received packet. Or, it can just receive the (original) packet 1 and the (retransmitted) packet 2 separately yet still may benefit due to time and beam diversity, if the channel is dynamic and allows for diversity gains.

As discussed above for the virtual omni directional antenna (FIG. 11), the commutation sequence may also be applied to a multiple input multiple output (MIMO) system implementing a virtual beam former. In other words, each antenna is operated using a subset of the available directional antenna beams 20 for providing a virtual beam former. The commutation sequencing may be different for each switched beam antenna for increasing spatial separation for each receive direction. Alternatively, the commutation sequencing may be the same for each switched beam antenna for increasing energy collection for maximal ratio combining (MRC).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed is:

1. A client station for operating in a wireless local area network (WLAN) communication system, the client station comprising:
    a switched beam antenna for generating a plurality of directional antenna beams;
    a beam switching unit coupled to said switched beam antenna for selecting the plurality of directional antenna beams;
    a transceiver coupled to said beam switching unit; and
    a beam commutation module for running a beam commutation algorithm for performing a commutation sequencing of the plurality of directional antenna elements so that said switched beam antenna is operated as a virtual beam former by
        selecting one of the directional antenna beams for receiving desired signals,
        selecting at least one other directional antenna beam for receiving the desired signals, and
        alternating selection of the directional antenna beams for receiving the desired signals;
    with said plurality of directional antenna beams being grouped into pairs, with the directional antenna beams in each pair being directly adjacent one another, and with the commutation sequencing sequences through opposing pairs with a directional antenna beam being alternately selected in each opposing pair.

2. A client station according to claim 1 wherein the commutation sequencing sequences through opposing directional antenna beams consecutively.

3. A client station according to claim 1 wherein the commutation sequencing sequences through the directional antenna beams from a wide set of directional antenna beams to a narrower set of directional antenna beams.

4. A client station according to claim 1 wherein the commutation sequencing sequences through all possible beam transitions of the directional antenna beams.

5. A client station according to claim 1 wherein the commutation sequencing is non-periodic.

6. A client station according to claim 1 further comprising at least one additional switched beam antenna for generating at least one additional directional antenna beam, at least one additional beam switching unit and at least one additional transceiver so that the client station is configured as a multiple input multiple output (MIMO) system; and wherein said beam commutation module runs the beam commutation algorithm so that a respective commutation sequencing is performed to include the at least one additional directional antenna beam.

7. A client station according to claim 6 wherein the commutation sequencing is different for each switched beam antenna for increasing spatial separation for each receive direction.

8. A client station according to claim 6 wherein the commutation sequencing is the same for each switched beam antenna for increasing energy collection for maximal ratio combining (MRC).

9. A client station according to claim 1 wherein said switched beam antenna comprises N antenna elements comprising at least one active antenna element and up to N−1 passive antenna elements.

10. A client station for operating in a wireless local area network (WLAN) communication system, the client station comprising:
a single array switched beam antenna for generating a plurality of directional antenna beams for receiving signals;
a beam switching unit coupled to said single array switched beam antenna for selecting the plurality of directional antenna beams;
a transceiver coupled to said beam switching unit; and
a beam commutation module for running a beam commutation algorithm, and when the beam commutation algorithm determines that an optimum direction for receiving the signals is between two adjacent directional antenna beams, then the beam commutation algorithm operates with a subset of the directional antenna beams so that said single array switched beam antenna operates as a virtual beam former by
selecting one of the directional antenna beams from the subset of directional antenna beams that is adjacent one side of the optimum direction for receiving the signals,
selecting another one of the directional antenna beams from the subset of directional antenna beams that is adjacent the other side of the optimum direction for receiving the signals, and
alternating selection of the directional antenna beams on each side of the optimum direction for receiving subsequent signals.

11. A client station according to claim 10 wherein one of the selected directional antenna beams is a first preferred directional antenna beam, and the other selected directional antenna beam is a second preferred directional antenna beam.

12. A client station according to claim 11 wherein said beam commutation algorithm defines a list of candidate directional antenna beams, and wherein the second preferred directional antenna beam is selected from the list.

13. A client station according to claim 10 further comprising at least one additional single array switched beam antenna, at least one additional beam switching unit and at least one additional transceiver so that the client station is configured as a multiple input multiple output (MIMO) system; and wherein said beam commutation module runs the beam commutation algorithm so that a respective virtual beam former is formed by each single array switched beam antenna.

14. A client station according to claim 13 wherein the directional antenna beams selected by each virtual beam former are the same.

15. A client station according to claim 13 wherein the directional antenna beams selected by each virtual beam former are different from one another.

16. A client station according to claim 10 wherein said single array switched beam antenna comprises N antenna elements comprising at least one active antenna element and up to N−1 passive antenna elements.

17. A client station for operating in a wireless local area network (WLAN) communication system, the client station comprising:
a single array switched beam antenna for generating a plurality of directional antenna beams for receiving signals;
a beam switching unit coupled to said single array switched beam antenna for selecting the plurality of directional antenna beams;
a transceiver coupled to said beam switching unit; and
a beam commutation module for running a beam commutation algorithm for
selecting a preferred directional antenna beam,
monitoring a link quality associated with the preferred directional antenna beam, and when the link quality drops below a threshold, then
operating said single array switched beam antenna as a virtual beam former by
selecting one of the directional antenna beams from a candidate list of directional antenna beams for receiving signals,
selecting at least one other directional antenna beam from the candidate list of directional antenna beams for receiving the signals, and
alternating selection of the directional antenna beams from the candidate list of directional antenna beams for receiving subsequent signals.

18. A client station according to claim 17 wherein the non-selected directional antenna beams are scanned for generating the candidate list of directional antenna beams.

19. A client station according to claim 17 wherein the signals being exchanged by each of the directional antenna beams from the candidate list of directional antenna beams are the same.

20. A client station according to claim 17 wherein said single array switched beam antenna comprises N antenna elements comprising at least one active antenna element and up to N−1 passive antenna elements.

21. A method for operating a client station in a wireless local area network (WLAN) communication system comprising a switched beam antenna, a beam switching unit coupled to the switched beam antenna, and a transceiver coupled to the beam switching unit, the method comprising:
operating the beam switching unit for selecting the plurality of directional antenna beams; and
running a beam commutation algorithm for performing a commutation sequencing of the plurality of directional antenna elements so that a virtual omni-directional antenna beam is formed by
selecting one of the directional antenna beams for receiving desired signals,
selecting at least one other directional antenna beam for receiving the desired signals, and
alternating selection of the directional antenna beams for receiving the desired signals;
with said plurality of directional antenna beams being grouped into pairs, with the directional antenna beams in each pair being directly adjacent one another, and with the commutation sequencing sequences through opposing pairs with a directional antenna beam being alternately selected in each opposing pair.

22. A method according to claim 21 wherein the commutation sequencing sequences through opposing directional antenna beams consecutively.

23. A method according to claim 21 wherein the commutation sequencing sequences through the directional antenna beams from a wide set of directional antenna beams to a narrower set of directional antenna beams.

24. A method according to claim 21 wherein the commutation sequencing sequences through all possible beam transitions of the directional antenna beams.

25. A method according to claim 21 wherein the commutation sequencing is non-periodic.

26. A method according to claim 21 wherein the client station further comprises at least one additional switched beam antenna, at least one additional beam switching unit and at least one additional transceiver so that the client station is configured as a multiple input multiple output (MIMO) system; and wherein the beam commutation algorithm is run so that a respective commutation sequencing is performed for each switched beam antenna for forming a virtual omnidirectional antenna beam associated therewith.

* * * * *